US010384979B2

(12) United States Patent
Kang et al.

(10) Patent No.: US 10,384,979 B2
(45) Date of Patent: Aug. 20, 2019

(54) POLYCRYSTALLINE DIAMOND COMPACT WITH IMPROVED THERMAL STABILITY

(71) Applicant: ILJIN DIAMOND CO., LTD., Eumseong (KR)

(72) Inventors: Dong Heon Kang, Bucheon (KR); Hee Sub Park, Suwon (KR)

(73) Assignee: ILJIN DIAMOND CO., LTD., Eumseong (KR)

( * ) Notice: Subject to any disclaimer, the term of this patent is extended or adjusted under 35 U.S.C. 154(b) by 177 days.

(21) Appl. No.: 15/113,825

(22) PCT Filed: Feb. 3, 2015

(86) PCT No.: PCT/KR2015/001077
§ 371 (c)(1),
(2) Date: Jul. 23, 2016

(87) PCT Pub. No.: WO2015/119406
PCT Pub. Date: Aug. 13, 2015

(65) Prior Publication Data
US 2016/0340259 A1    Nov. 24, 2016

(30) Foreign Application Priority Data
Feb. 4, 2014   (KR) .................... 10-2014-0012727

(51) Int. Cl.
*B24D 3/02* (2006.01)
*C04B 35/528* (2006.01)
(Continued)

(52) U.S. Cl.
CPC ............ *C04B 35/528* (2013.01); *B32B 18/00* (2013.01); *C04B 35/6262* (2013.01);
(Continued)

(58) Field of Classification Search
USPC .......................................... 51/293, 307, 309
See application file for complete search history.

(56) References Cited

U.S. PATENT DOCUMENTS

2008/0115421 A1*  5/2008  Sani ........................ B22F 7/08
                                                              51/295
2013/0264124 A1* 10/2013  Belnap ..................... B01J 3/06
                                                              175/428

FOREIGN PATENT DOCUMENTS

KR    10-2009-0048127 A    5/2009
KR    10-2009-0113259 A   10/2009
(Continued)

*Primary Examiner* — James E McDonough
(74) *Attorney, Agent, or Firm* — Patent Office of Dr. Chung Park

(57) ABSTRACT

The present invention relates to a polycrystalline diamond compact. A method for manufacturing a polycrystalline diamond compact includes: preparing primary sintering by mixing and assembling first diamond particles and metal binder particles; sintering the mixed and assembled particles; leaching the upper surface of the sintered polycrystalline diamond compact; preparing secondary sintering by mixing second diamond particles and the metal binder particles and assembling the mixed particles on the upper surface of the primarily sintered polycrystalline diamond compact; sintering the sintered polycrystalline diamond compact and the mixed particles of the upper part; and a grinding step of grinding the reassembled second diamond particles and metal binder particles so as to remove the same. The polycrystalline diamond compact minimizes the content of the residual metal binder in a surface layer and increases the content of the diamond particles with high thermal conductivity, thereby increasing the lifespan of the polycrystalline diamond compact.

7 Claims, 10 Drawing Sheets

(51) Int. Cl.

| | |
|---|---|
| *B32B 18/00* | (2006.01) |
| *E21B 10/573* | (2006.01) |
| *C04B 35/626* | (2006.01) |
| *C04B 35/65* | (2006.01) |
| *E21B 10/55* | (2006.01) |
| *E21B 10/567* | (2006.01) |
| *C22C 26/00* | (2006.01) |
| *B24D 3/00* | (2006.01) |
| *B24D 11/00* | (2006.01) |
| *B24D 18/00* | (2006.01) |
| *C09K 3/14* | (2006.01) |
| *E21B 10/54* | (2006.01) |

(52) U.S. Cl.
CPC .............. *C04B 35/65* (2013.01); *C22C 26/00* (2013.01); *E21B 10/55* (2013.01); *E21B 10/567* (2013.01); *E21B 10/5735* (2013.01); *C04B 2235/427* (2013.01); *C04B 2235/5436* (2013.01); *C04B 2235/5445* (2013.01); *C04B 2237/363* (2013.01); *C04B 2237/588* (2013.01); *E21B 2010/545* (2013.01)

(56) References Cited

FOREIGN PATENT DOCUMENTS

| | | |
|---|---|---|
| KR | 10-2010-0015759 A | 2/2010 |
| KR | 10-2012-0034659 A | 4/2012 |
| KR | 10-2012-0114240 A | 10/2012 |

\* cited by examiner

[FIG. 1]
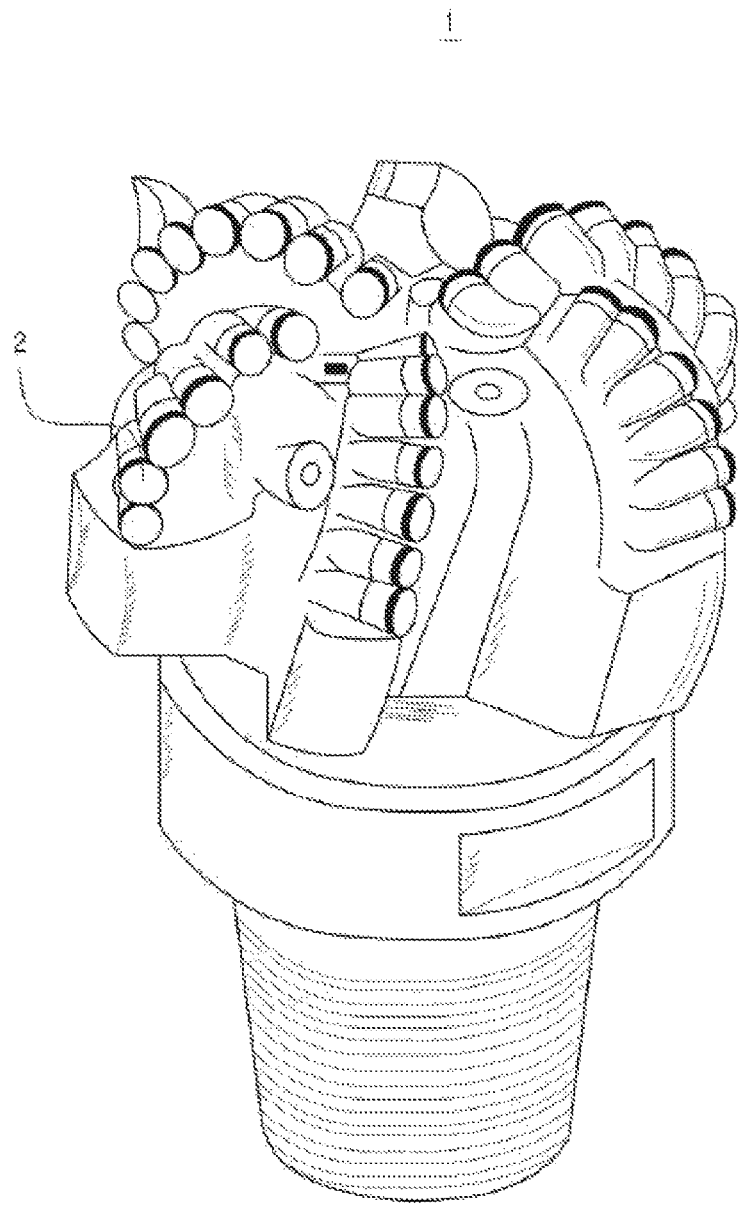

[FIG. 2]
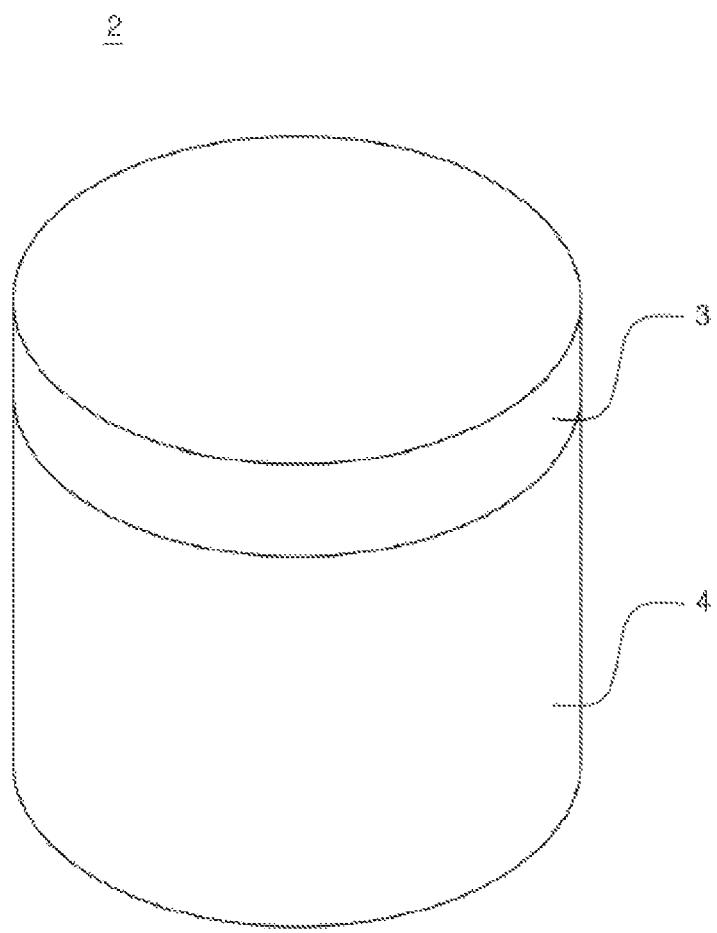

[FIG. 3]
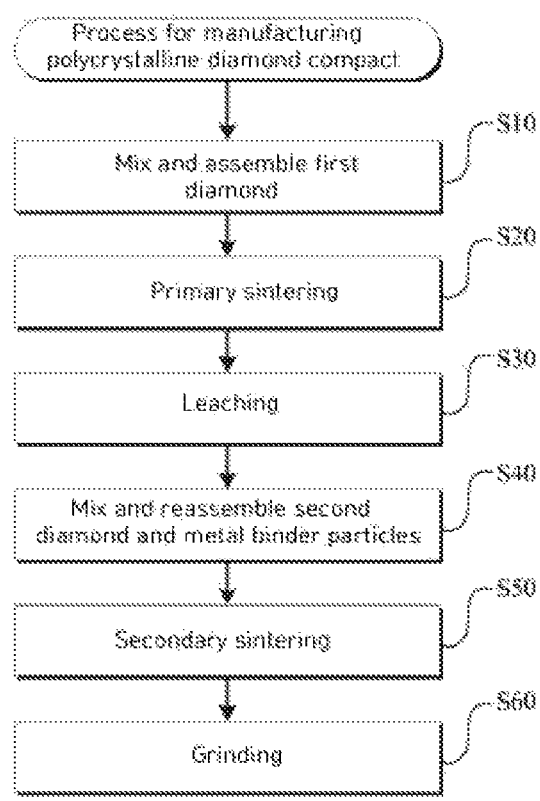

[FIG. 4]
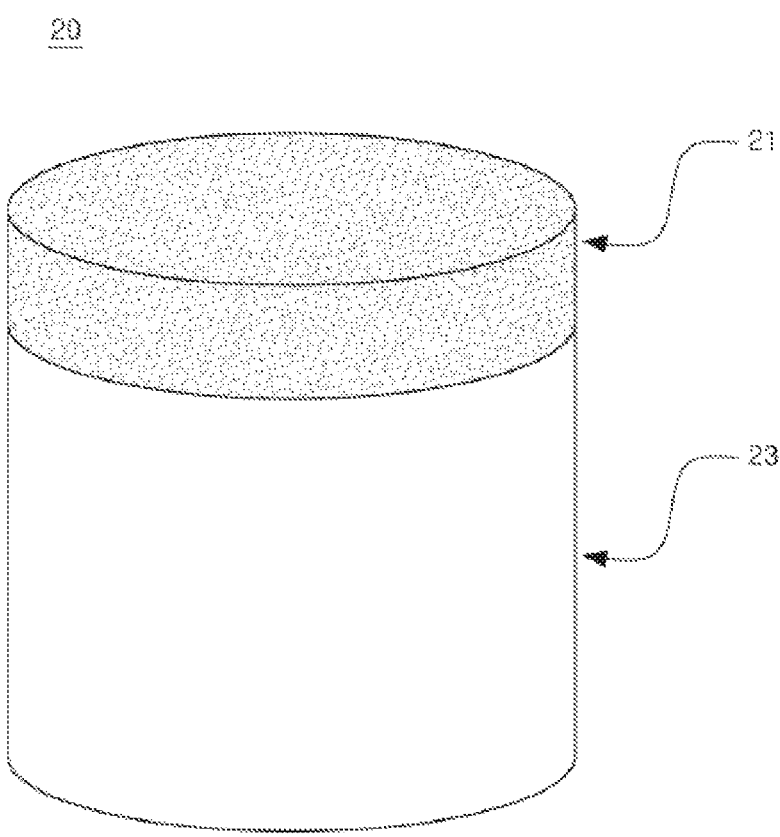

[FIG. 5]
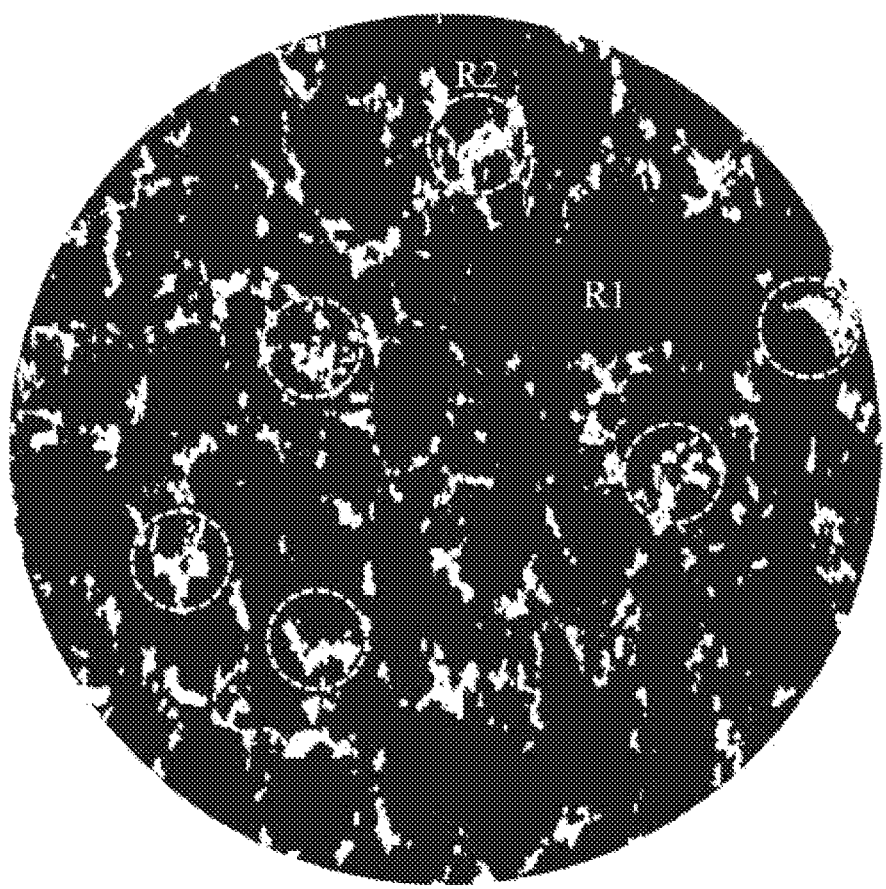

[FIG. 6]
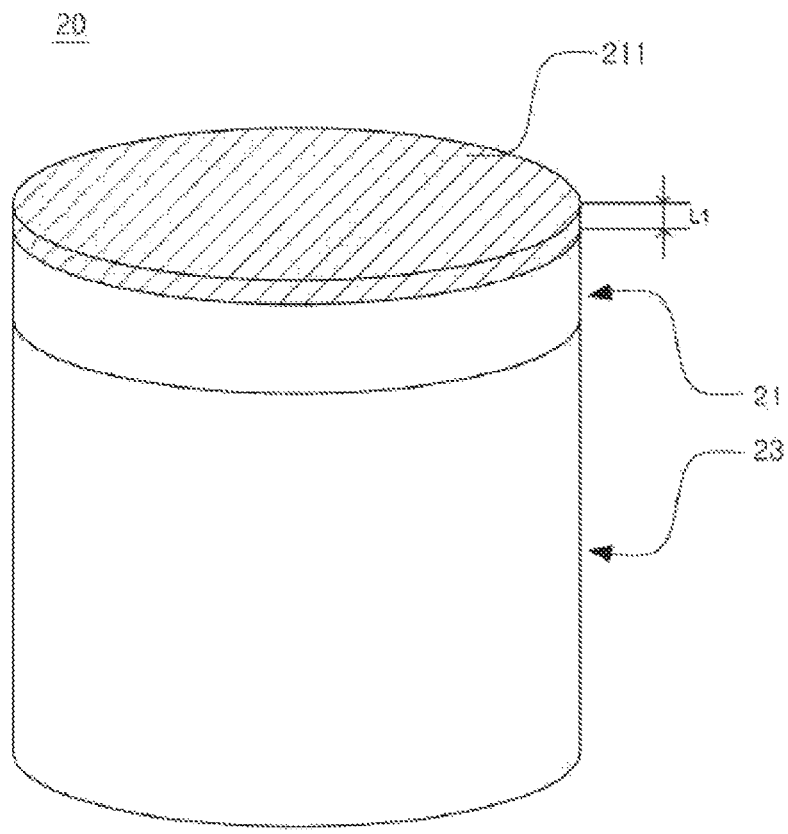

[FIG. 7]
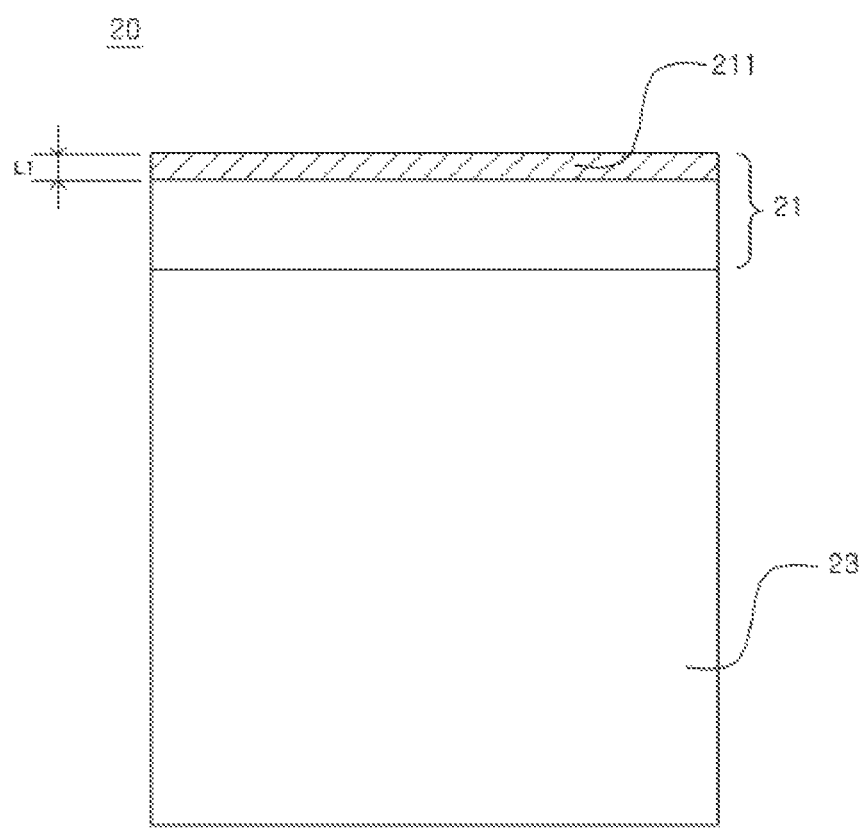

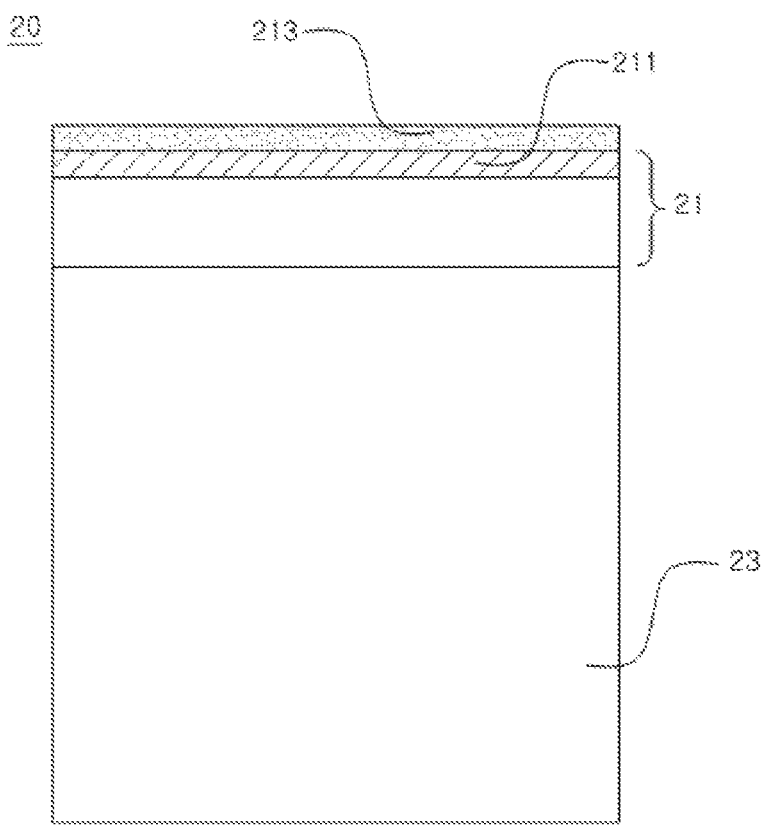
[FIG. 8]

[FIG. 9]
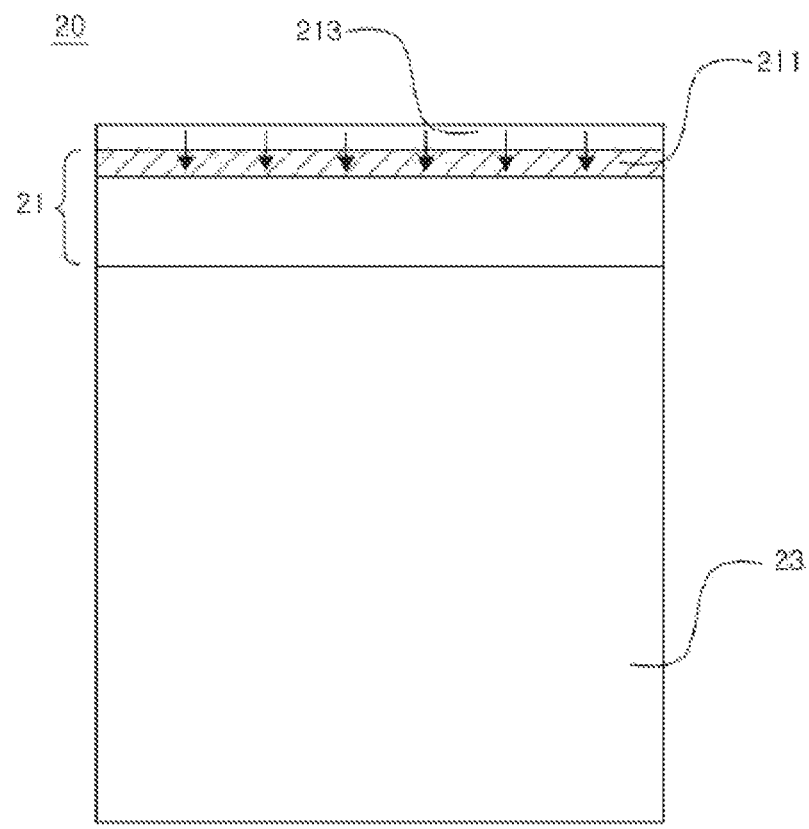

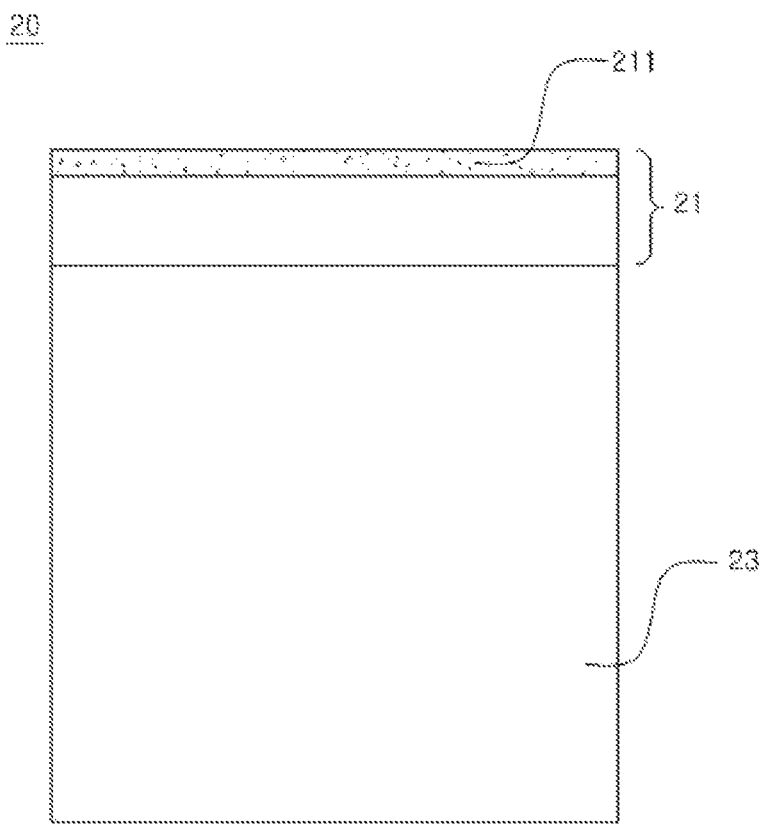
[FIG. 10]

POLYCRYSTALLINE DIAMOND COMPACT WITH IMPROVED THERMAL STABILITY

CROSS-REFERENCE TO PRIOR APPLICATION

This application is a national Stage Patent Application of PCT International Patent Application No. PCT/KR2015/001077, filed on Feb. 3, 2015 under 35 U.S.C. § 371, which claims priority of Korean Patent Application No. 10-2014-0012727, filed on Feb. 4, 2014, which are all hereby incorporated by reference in their entirety.

TECHNICAL FIELD

The present invention relates to a polycrystalline diamond compact with improved thermal stability, and more particularly, to a polycrystalline diamond compact material with improved thermal stability which is used for drilling petroleum gas and processing a difficult to cut.

BACKGROUND ART

A polycrystalline diamond compact (PDC) is manufactured with diamond particles on a sintered carbide substrate by a metal catalyst under high temperature and high pressure.

The PDC is used in various fields including cutting, milling, drilling, abrasion-resistant bearing, and the like. Among them, in a PDC used for oil well drilling, hot heat is generated due to friction between various ground layers caused by high pressure during drilling.

However, the hot heat generated during operating is applied to the PDC, and in this case, in the PDC, cracks and breakage may be generated by a difference in thermal expansion coefficient between diamond particles and a metal catalyst which constitute the PDC.

SUMMARY OF INVENTION

The present invention is directed to provide a polycrystalline diamond compact with increased diamond content and a method for manufacturing the same by implementing an efficient distribution of a metal catalyst which remains in the polycrystalline diamond compact and replacing the metal catalyst with diamond particles.

The present invention is also directed to provide a polycrystalline diamond compact and a method for manufacturing the same which increase the diamond content of the surface part so as to minimize heat remaining in the inside by rapidly emitting the heat during processing and minimize initial breakage caused by a difference in thermal expansion coefficient between a metal binder and diamond particles.

Technical Solution

An aspect of the present invention provides a method for manufacturing a polycrystalline diamond compact, comprising: a step of preparing primary sintering by mixing and assembling first diamond particles and metal binder particles; a primary sintering step of sintering the mixed and assembled particles; a step of leaching the upper surface of the sintered polycrystalline diamond compact; a step of preparing secondary sintering by mixing second diamond particles and the metal binder particles and assembling the mixed particles on the upper surface of the primarily sintered polycrystalline diamond compact; a secondary sintering step of sintering the sintered polycrystalline diamond compact and the mixed particles of the upper part; and a grinding step of grinding the reassembled second diamond particles and metal binder particles so as to remove the same.

Further, a crystalline size of the diamond particles sintered in the primary sintering step may be larger than that of the diamond particles added after the primary sintering step.

A diameter of the first diamond particle may be formed in a range of 4 to 40 μm.

Further, a diameter of the second diamond particle may be formed within maximum 0.5 μm.

In the leaching step, a leaching depth may be formed in a range of 100 to 500 μm.

Further, the metal binder particles may include at least one metal component.

The metal binder particles may include at least one metal component of cobalt, nickel, and iron Another aspect of the present invention provides a polycrystalline diamond compact, comprising: a sintered carbide substrate; a polycrystalline diamond sintered layer manufactured by any one manufacturing method of the aforementioned methods.

Further, the polycrystalline diamond sintered layer may be filled by penetrating and distributing the second diamond powder in the pores by leaching in which the leaching depth of the upper part is in the range of 100 to 500 μm.

Advantageous Effects

A metal binder improves the sinterability of the diamond particles and increases the impact resistance of a sintered body. However, when the metal binder is applied at a cutting edge portion of the diamond compact, heat resistance is reduced, thereby causing bad effects such as cracks or breakage, whereas the polycrystalline diamond compact, according to the present invention, minimizes the content of the residual metal binder in a surface layer part and increases the content of the diamond particles with high thermal conductivity, thereby increasing the lifespan of the polycrystalline diamond compact.

Further, the polycrystalline diamond compact according to the present invention has a more excellent heat emission than the related art by efficiently distributing the metal binder remaining in the inside to reduce an effect on cracks, breakage, and the like caused by the heat, thereby improving performance of the polycrystalline diamond compact.

DESCRIPTION OF DRAWINGS

FIG. 1 is a schematic view illustrating an appearance a cutting tool using a polycrystalline diamond compact.

FIG. 2 is a perspective view illustrating an appearance of a polycrystalline diamond compact in the related art.

FIG. 3 is a flowchart illustrating a method for manufacturing a polycrystalline diamond compact according to an exemplary embodiment of the present invention.

FIG. 4 is a perspective view illustrating an assembled state of diamond particles and metal binder particles according to the exemplary embodiment.

FIG. 5 is an SEM image illustrating a surface state while the diamond particles and metal the binder particles according to the exemplary embodiment are primarily sintered.

FIGS. 6 and 7 are a perspective view and a cross-sectional view illustrating an appearance in a leaching step according to the exemplary embodiment, respectively.

FIG. 8 is a cross-sectional view illustrating an assembled state for secondary sintering according to the exemplary embodiment.

FIG. 9 is a cross-sectional view schematically illustrating an appearance when sintering the polycrystalline diamond compact according to the exemplary embodiment.

FIG. 10 is a cross-sectional view illustrating an appearance after grinding of the polycrystalline diamond compact according to the exemplary embodiment.

MODES OF THE INVENTION

A method for manufacturing a polycrystalline diamond compact, according to the present invention, comprises: a step of preparing primary sintering by mixing and assembling first diamond particles and metal binder particles; a primary sintering step of sintering the mixed and assembled particles; a step of leaching the upper surface of the sintered polycrystalline diamond compact; a step of preparing secondary sintering by mixing second diamond particles and the metal binder particles and assembling the mixed particles on the upper surface of the primarily sintered polycrystalline diamond compact; a secondary sintering step of sintering the sintered polycrystalline diamond compact and the mixed particles of the upper part; and a grinding step of grinding the reassembled second diamond particles and metal binder particles so as to remove the same.

DESCRIPTION OF EMBODIMENT(S)

Hereinafter, exemplary embodiments of the present invention will be described with reference to the accompanying drawings. If not particularly defined or mentioned, a term indicating a direction used in the present description is based on a state illustrated in the drawings. Further, through each exemplary embodiment, like reference numerals denote like elements. Meanwhile, the thickness or size of each component illustrated in the drawings may be exaggerated for easy description and does not mean that the thickness or size should be configured by a ratio between the corresponding size or component.

FIG. 1 is a schematic view illustrating an appearance a cutting tool using a polycrystalline diamond compact. FIG. 2 is a perspective view illustrating an appearance of a polycrystalline diamond compact in the related art.

Various cutting tools are used in metal/wood cutting and the like. Particularly, in petroleum and gas drilling fields, the ground needs to be cut and excavated, and thus digging and excavating equipment in which abrasion resistance can be ensured as much as possible is used.

A cutting tool 1 is provided at an end of the equipment as illustrated in FIG. 1. In general, the abrasion resistance may be sufficiently ensured at the end of the cutting tool 1 by using a diamond compact 2 in spite of friction with the ground.

In FIG. 2, an appearance of a general diamond compact 2 is illustrated. As illustrated in FIG. 2, in the diamond compact 2, a polycrystalline diamond sintered body 3 which is sintered by using diamond powder is formed on a sintered carbide substrate 4. The sintered carbide substrate 4 serves to support the diamond sintered body 2 to be attached to various tools and the like while the polycrystalline diamond sintered body 3 is attached.

Such a polycrystalline diamond compact 2 is excellent as compared with a tool manufactured by only sintered carbide metal, but there is a problem in processing. That is, a metal matrix (Co, Ni, Fe, etc.) and diamond particles are included in the polycrystalline diamond, a difference in thermal expansion coefficient between the metal and the polycrystalline diamond is large, and the difference affects thermal vibration to generate initial destruction such as cracks and breakage. The present invention is contrived in order to solve the problems.

A method for manufacturing a polycrystalline diamond compact according to an exemplary embodiment of the present invention will be described with reference to FIG. 3. FIG. 3 is a flowchart illustrating a method for manufacturing a polycrystalline diamond compact according to an exemplary embodiment of the present invention.

In order to solve the aforementioned problems, a method for primary and secondary sintering is applied to the present invention. The method for manufacturing the polycrystalline diamond compact according to the exemplary embodiment includes the following processes.

First, primary sintering is prepared by mixing and assembling first diamond particles and metal binder particles (S10), and sintering the mixed and assembled particles are sintered as a second step (S20).

Next, the metal binders distributed on the upper surface part are removed by leaching the upper surface of the sintered polycrystalline diamond compact to form a pore (S30).

Next, secondary sintering is prepared by mixing second diamond particles and the metal binder particles and assembling the mixed particles on the upper surface of the primarily sintered polycrystalline diamond compact (S40), and thereafter, the sintered polycrystalline diamond compact and the mixed particles of the upper part are secondarily sintered (S50).

After the secondary sintering is completed, a layer positioned with the reassembled second diamond particles and metal binder particles is grinded and removed (S60).

Referring to FIGS. 4 to 10, a manufacturing process of the polycrystalline diamond compact will be described in detail for each step. FIG. 4 is a perspective view illustrating an assembled state of diamond particles and metal binder particles according to the exemplary embodiment, and FIG. 5 is an SEM image illustrating a surface state while the diamond particles and metal the binder particles according to the exemplary embodiment are primarily sintered. Further, FIGS. 6 and 7 are a perspective view and a cross-sectional view illustrating an appearance in a leaching step according to the exemplary embodiment, respectively, and FIG. 8 is a cross-sectional view illustrating an assembled state for secondary sintering according to the exemplary embodiment. Further, FIG. 9 is a cross-sectional view schematically illustrating an appearance when sintering the polycrystalline diamond compact according to the exemplary embodiment, and FIG. 10 is a cross-sectional view illustrating an appearance after grinding of the polycrystalline diamond compact according to the exemplary embodiment.

First, as described above, the primary sintering is prepared by mixing and then assembling the first diamond particles and the metal binder particles as illustrated in FIG. 4.

In this case, it is preferred that the diameter of the used first diamond particle is formed in a range of 4 to 40 μm. When the size of the diamond particle is increased, impact resistance is increased, but abrasion resistance is decreased, whereas when the size of the particle is decreased, the abrasion resistance is increased, but the impact resistance is decreased. As a result, it is preferred that the diameter of the first diamond particle is determined in the range of 4 to 40 μm according to a purpose of the tool. Further, when the diameter of the first diamond particle is larger than 40 μm, the second diamond particles to be described below are aggregated between the first diamond particles and thus, it is difficult to obtain the technical effect according to the present invention.

The metal binder particles may include at least one metal component of cobalt, nickel, iron, and the like.

Next, a polycrystalline diamond sintered body 21 is formed by sintering the assembled and mixed particles. In this case, the upper surface of the polycrystalline diamond sintered body 21 may observe a first diamond particle R1 and a binder pool R2 between the first diamond particles R1 as illustrated in FIG. 5.

Referring to FIG. 6, binder metals which are distributed on the surface part of the polycrystalline diamond sintered body 21 are removed by leaching the surface part 211 of the polycrystalline diamond sintered body 21 to form a binder pool as pores. In this case, a leaching depth L1 may be formed in a range of 100 to 500 μm. In this case, when the leaching depth is smaller than 100 μm, it is difficult to obtain the technical effect according to the present invention, whereas when the leaching depth is larger than 500 μm, impact resistance is decreased, and thus performance of the tool is deteriorated and penetration of the second diamond particles to be described below is difficult.

Thereafter, as illustrated in FIG. 8, the secondary sintering is prepared by reassembling the mixed powder of the second diamond particles and the metal binder particles on the leached surface part 211. In this case, a diameter of the second diamond particle may be formed within maximum 0.5 μm. When the diameter of the second diamond particle is larger than 0.5 μm, it is difficult that the second diamond particles penetrate between the first diamond particles with the size of 4 to 40 μm as described above.

Thereafter, as illustrated in FIG. 9, the secondary sintering is performed. In this case, the second diamond particles are broken under high temperature and high pressure to penetrate into the pores generated after leaching and distributed, and carbon (C) is released from the diamond particles by a metal binder (catalyst) added during sintering. The released carbon serves to connect diamond particle grains or perform a growth of the diamond particles to fill the inner pores, thereby increasing the content of the diamond of the leached surface part 211.

Thereafter, when a reassembling layer 213 reassembled for the secondary sintering is grinded and removed, the polycrystalline diamond compact 20 illustrated in FIG. 10 is formed.

In this case, in the surface part 211 of the polycrystalline diamond sintering layer 21, the diamond content after secondary sintering is larger than the diamond content after primary sintering, and thus thermal conductivity is increased, thereby efficiently emitting the heat generated during processing. As a result, the problem caused by the heat is reduced and the performance of the polycrystalline diamond compact is improved.

Although preferable embodiments of the present invention have been exemplarily described as above, the technical spirit of the present invention is limited to the preferable embodiments and the present invention can be variously implemented within the scope without departing from the spirit of the present invention which is specifically described in the appended claims.

The invention claimed is:

1. A method for manufacturing a polycrystalline diamond compact, comprising:
   a step of preparing primary sintering by mixing and assembling first diamond particles and metal binder particles;
   a primary sintering step of sintering the mixed and assembled particles;
   a step of leaching the upper surface of the sintered polycrystalline diamond compact;
   a step of preparing secondary sintering by mixing second diamond particles and the metal binder particles and assembling the mixed particles on the upper surface of the primarily sintered polycrystalline diamond compact;
   a secondary sintering step of sintering the sintered polycrystalline diamond compact and the mixed particles of the upper part; and
   a grinding step of grinding the reassembled second diamond particles and metal binder particles so as to remove the same.

2. The method for manufacturing the polycrystalline diamond compact of claim 1, wherein a crystalline size of the diamond particles sintered in the primary sintering step is larger than that of the diamond particles added after the primary sintering step.

3. The method for manufacturing the polycrystalline diamond compact of claim 2, wherein a diameter of the first diamond particle is formed in a range of 4 to 40 μm.

4. The method for manufacturing the polycrystalline diamond compact of claim 3, wherein a diameter of the second diamond particle is formed within maximum 0.5 μm.

5. The method for manufacturing the polycrystalline diamond compact of claim 1, wherein in the leaching step, a leaching depth is formed in a range of 100 to 500 μm.

6. The method for manufacturing the polycrystalline diamond compact of claim 1, wherein the metal binder particles include at least one metal component.

7. The method for manufacturing the polycrystalline diamond compact of claim 1, wherein the metal binder particles include at least one metal component of cobalt, nickel, and iron.

* * * * *